(12) United States Patent
Hwang

(10) Patent No.: US 7,917,029 B2
(45) Date of Patent: Mar. 29, 2011

(54) CAMERA SYSTEM AND METHOD FOR CONTROLLING THE SAME

(75) Inventor: Chi-hun Hwang, Changwon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 227 days.

(21) Appl. No.: 12/215,952

(22) Filed: Jul. 1, 2008

(65) Prior Publication Data

US 2009/0067831 A1 Mar. 12, 2009

(30) Foreign Application Priority Data

Sep. 6, 2007 (KR) .................. 10-2007-0090594

(51) Int. Cl.
*G03B 17/00* (2006.01)
(52) U.S. Cl. ........................ 396/533; 359/829
(58) Field of Classification Search .............. 396/533; 359/829
See application file for complete search history.

(56) References Cited

U.S. PATENT DOCUMENTS

| | | | | |
|---|---|---|---|---|
| 3,388,647 A | * | 6/1968 | Yajima | 396/533 |
| 3,439,600 A | * | 4/1969 | Suzuki | 396/533 |
| 5,157,599 A | * | 10/1992 | Miyamoto | 358/471 |
| 2006/0165401 A1 | * | 7/2006 | Doi et al. | 396/71 |
| 2006/0216023 A1 | * | 9/2006 | Tokiwa et al. | 396/532 |

FOREIGN PATENT DOCUMENTS

| | | |
|---|---|---|
| JP | 10-221766 A | 8/1998 |
| JP | 2000-029116 A | 1/2000 |

OTHER PUBLICATIONS

Translation of JP Publication No. 05-333414; Title: Lens Attaching/Detaching Device for Interchangeable Lens Camera; Inventor: Yasuaki Ishiguro; Publication Date: Dec. 17, 1993.*

* cited by examiner

*Primary Examiner* — W. B. Perkey
*Assistant Examiner* — Fang-Chi Chang
(74) *Attorney, Agent, or Firm* — Drinker Biddle & Reath LLP

(57) ABSTRACT

An automatic-lens-connection-type camera system, which detects insertion of a lens unit into a mount part and automatically screws a mount connector to connect the lens unit with the mount part, and a method for controlling the camera system. The camera system includes a body, a lens module mounted to be attachable to and detachable from the body, a lens module insertion part mounted on a surface of the lens module that faces the body, and a mount part for detecting insertion of the lens module into the body to mount the lens module insertion part on the body.

19 Claims, 11 Drawing Sheets

CAMERA SYSTEM AND METHOD FOR CONTROLLING THE SAME

This application claims the benefit of Korean Patent Application No. 10-2007-0090594, filed on Sep. 6, 2007, in the Korean Intellectual Property Office, the entire content of which is incorporated herein by reference.

BACKGROUND OF THE INVENTION

1. Field of the Invention

The present invention relates to a camera system and a method for controlling the same, and more particularly, to a camera system in which a lens is attachable to and detachable from a body of a camera and a method for controlling the same.

2. Description of the Related Art

In recent years, digital single lens reflex (DSLR) cameras with which professional pictures can be taken are being widely used. A DSLR camera refers to a single-lens reflex camera with which digital pictures are taken.

Specifically, the single-lens reflex camera sends an image of an object to a viewfinder through a single lens and also sends light to a sensor used for taking pictures through the single lens. Popular types of digital cameras are double-lens reflex cameras. This type of digital camera can take pictures while an image transmitted to a sensor is being displayed on a screen because the image seen is different from the image being taken.

In a DSLR camera, a lens is attachable to and detachable from a body. Conventionally, bayonet type DSLR cameras are in common use. In a bayonet type DSLR camera, a lens is inserted into a mount provided in a body and screwed onto the mount so that the lens can be mounted on the body.

In the bayonet type DSLR camera, a groove made in the lens is caught by a protrusion provided in the mount of the body so that a user can screw the lens and connect the lens with the mount. In this case, a bayonet-type mount connection structure may be hand-operated. Thus, a user inserts a lens into a mount of a body and screws the lens onto the mount of the body by hand so that the lens can be combined with the mount of the body.

SUMMARY OF THE INVENTION

The present invention provides an automatic-lens-connection-type camera system, which detects insertion of a lens unit into a mount of a body and automatically screws a connection unit of the mount to connect the lens unit with the mount of the body, and a method for controlling the camera system.

Accordingly, an embodiment of the present invention provides a camera system including a body, a lens module mounted to be attachable to and detachable from the body, a lens module insertion part mounted on a surface of the lens module that faces the body, and a mount part for detecting insertion of the lens module into the body to mount the lens module insertion part on the body. The mount part may include a mount into which the lens module insertion part is inserted, a lens detector for detecting insertion of the lens module insertion part into the mount, a mount connector for fixing the lens module insertion part, and a driver for driving the mount connector when the lens detector detects the insertion of the lens module insertion part.

The mount may be disposed on a front surface of the body into which the lens module is inserted, and the mount part may further include a mount support for fixing the mount part to the body to interpose the mount connector between the mount and the mount support. The mount connector may be rotatably installed between the mount and the mount support.

The driver may include a driving motor installed on the body, and a driving gear mounted on the driving motor to be capable of rotating on a rotation axis of the driving motor. The mount connector may include a connection gear having a cylindrical or substantially cylindrical shape, a rotation gear disposed on an outer circumferential surface of the connection gear and receiving driving power from the driver, and a screw element having a screw thread that is disposed on an inner surface of the connection gear and combined with the lens module insertion part. The mount connector may further include a plurality of bearings, which are interposed between the mount connector and the mount and between the mount connector and the mount support. The bearings may be a plurality of ball bearings, and a guide groove for guiding the ball bearings may be formed along a circumferential surface of the connection gear. The mount part may include a plurality of lens detectors, which are disposed apart from one another, and the driver may start operating when all the lens detectors detect the insertion of the lens module insertion part.

The lens detector may include a sensor support mounted on the mount support, and a sensor mounted on the sensor support and for sensing the insertion of the lens module insertion part. The sensor may be disposed on a reverse side of a surface of the mount support that faces the mount, and through holes may be formed through the mount and the mount support, respectively, in positions corresponding to the sensor.

The lens module insertion part may include a lens connector inserted into and connected to the mount part, and a lens cover for fixing the lens connector to the lens module. The lens connector may include a screw element having a screw thread, which is disposed on an outer circumferential surface of an end portion of the lens connector that faces the mount part. The screw element of the lens connector may be combined with a screw thread disposed on an inner surface of the mount part.

The lens connector may include a protrusion element having a plurality of protrusions, which is disposed along an outer circumferential surface of an end portion of the lens connector that faces the mount part. The protrusion element of the lens connector may be combined with a screw thread disposed on an inner surface of the mount part.

The mount connector may include a screw element, which is disposed on an inner circumferential surface of the mount connector and combined with the lens module insertion part. Also, the lens connector may include a screw element, which is disposed on an outer circumferential surface of the lens connector and screw-connected with the screw element of the mount connector. At least one of the screw elements of the mount connector and the lens connector may include a helical gear.

The lens module insertion part may further include a lens unit protrusion disposed on a surface of the lens connector that faces the lens cover. The lens unit protrusion may protrude in a direction in which the lens module insertion part is inserted, and be inserted into a through hole formed in the mount part.

Another embodiment of the present invention provides a camera system including a body, a lens unit mounted to be attachable to and detachable from the body, a mount connector mounted on the body and for fixing the lens unit; a driver for driving the mount connector in response to an externally input driving signal, a lens attachable/detachable button for externally receiving a command to connect the lens unit with the mount connector and/or separate the lens unit from the mount connector to produce a command signal, and a controller for producing the driving signal in response to the command signal. The camera system may further include a lens detector for detecting insertion of the lens unit into the body to produce a lens unit insertion detection signal. The controller may produce the driving signal in response to the lens unit insertion detection signal.

Still another embodiment of the present invention provides a method for controlling a camera system to fix an attachable lens unit to a mount part of a body. The method includes detecting insertion of the lens unit into the body, driving a driving motor to connect the lens unit with the mount part, determining if the connection of the lens unit with the mount part is finished, and finishing the driving of the driving motor.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE EMBODIMENTS

Exemplary embodiments of the present invention will now be described more fully hereinafter with reference to the accompanying drawings.

Figure 1:
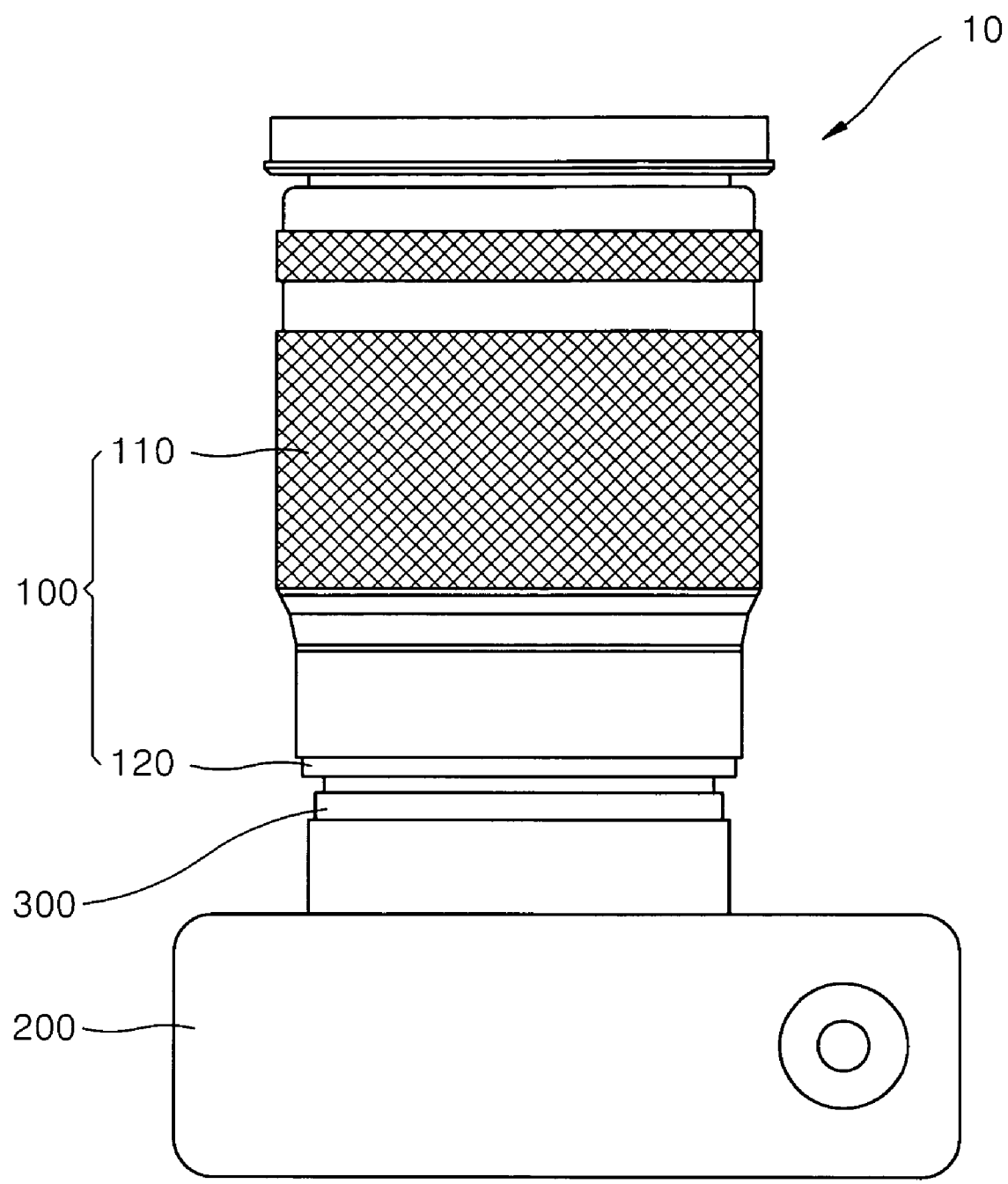
FIG. 1 illustrates an example of a camera system according to an embodiment of the present invention.
Figure 2:
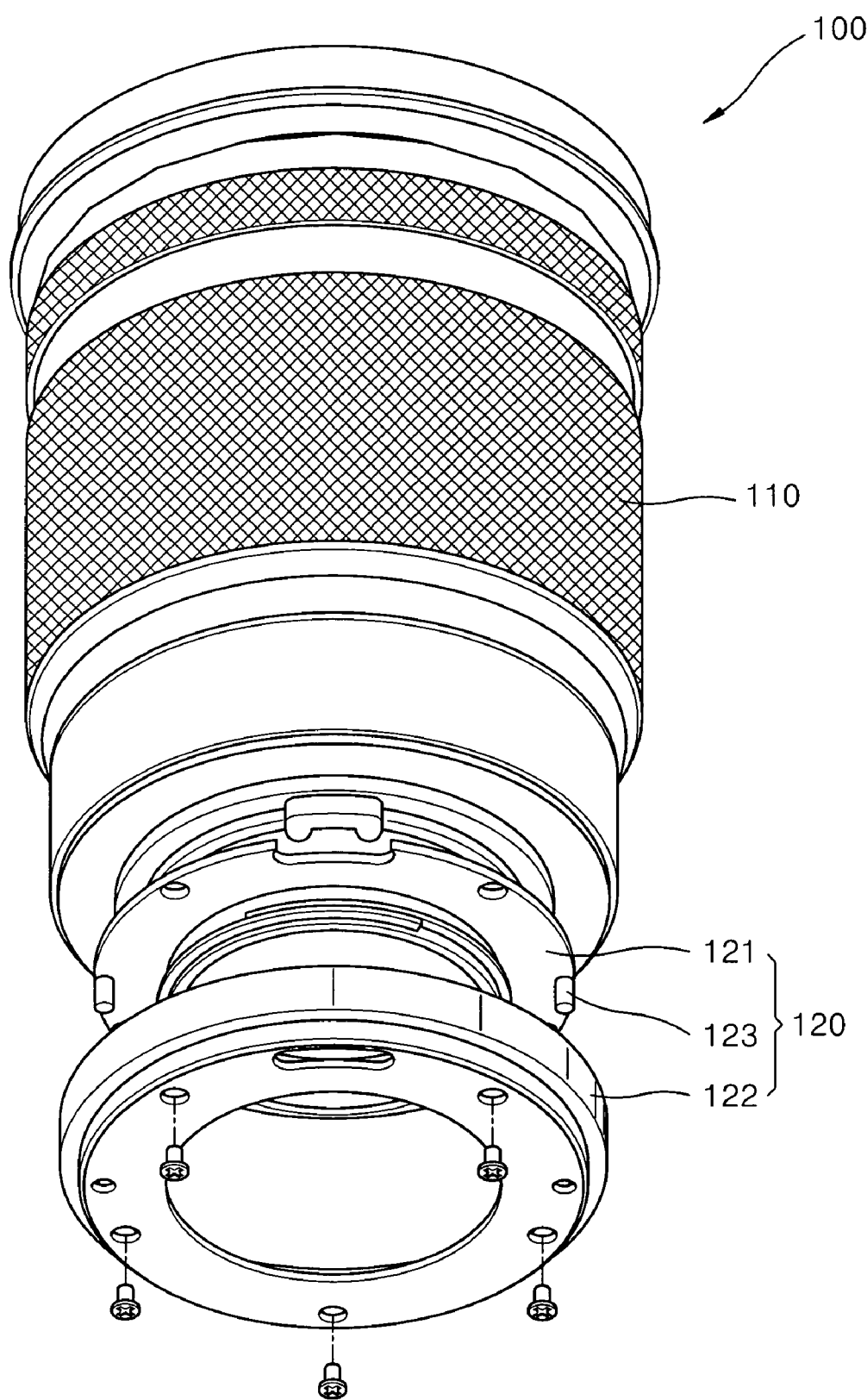
FIG. 2 illustrates an example of a lens unit of the camera system shown in FIG. 1, in which a lens module insertion part combined with a body is combined with a lens module.

FIG. 1 illustrates an example of a camera system 10 according to an embodiment of the present invention, and FIG. 2 illustrates an example of a lens unit 100, which is combined with a body 200 in the camera system 10 shown in FIG. 1. The lens unit 100 may be formed by combining a lens module insertion part 120 with a lens module 110.

Referring to FIGS. 1 and 2, the camera system 10 may include the lens unit 100 and a body unit 200 and 300. The lens unit 100 may include the lens module 110 and the lens module insertion part 120. The body unit 200 and 300 may include the body 200 and a mount part 300.

In the camera system 10, when the lens unit 100 is inserted into the mount part 300 mounted on the body 200, the mount part 300 detects the insertion of the lens unit 100 and automatically operates to fix the lens unit 100 to the body 200. That is, the camera system 10 is embodied as an automatic lens connection type so that the camera system 10 can detect the insertion of the lens unit 100 and automatically combine the lens unit 100 with the body 200.

Accordingly, the lens unit 100 can be combined with the body 200 promptly. Also, a user can promptly change desired lens modules according to the user's intention in an easier way.

In order to detect mounting of the lens unit 100 on the body 200, the lens unit 100 may include a detected part. Also, the mount part 300 may include a detector, which may detect the detected part of the lens unit 100.

The body 200 of the camera system 10 may include various internal components in order to realize functions of the camera system 10. The mount part 300 is mounted on the body 200 and combined with the lens module insertion part 120. In this case, the mount part 300 detects the insertion of the lens module insertion part 120 and is combined with the lens module insertion part 120 to fix the lens module insertion part 120 to the body 200.

Also, in the camera system 10 according to an embodiment of the present invention, a user may combine the lens module insertion part 120 with the mount part 300 or detach the lens module insertion part 120 from the mount part 300 with his or her hands. In this case, even if power is not supplied to the mount part 300, it is possible to combine the lens module insertion part 120 with the mount part 300 or detach the lens module insertion part 120 from the mount part 300.

The lens module 110 may be mounted to be attachable to and detachable from the body 200. The lens module insertion part 120 is mounted on a surface of the lens module 110 that faces the body 200, and combined with the mount part 300, so that the lens unit 100 can be mounted on the body 200.

Figure 3:
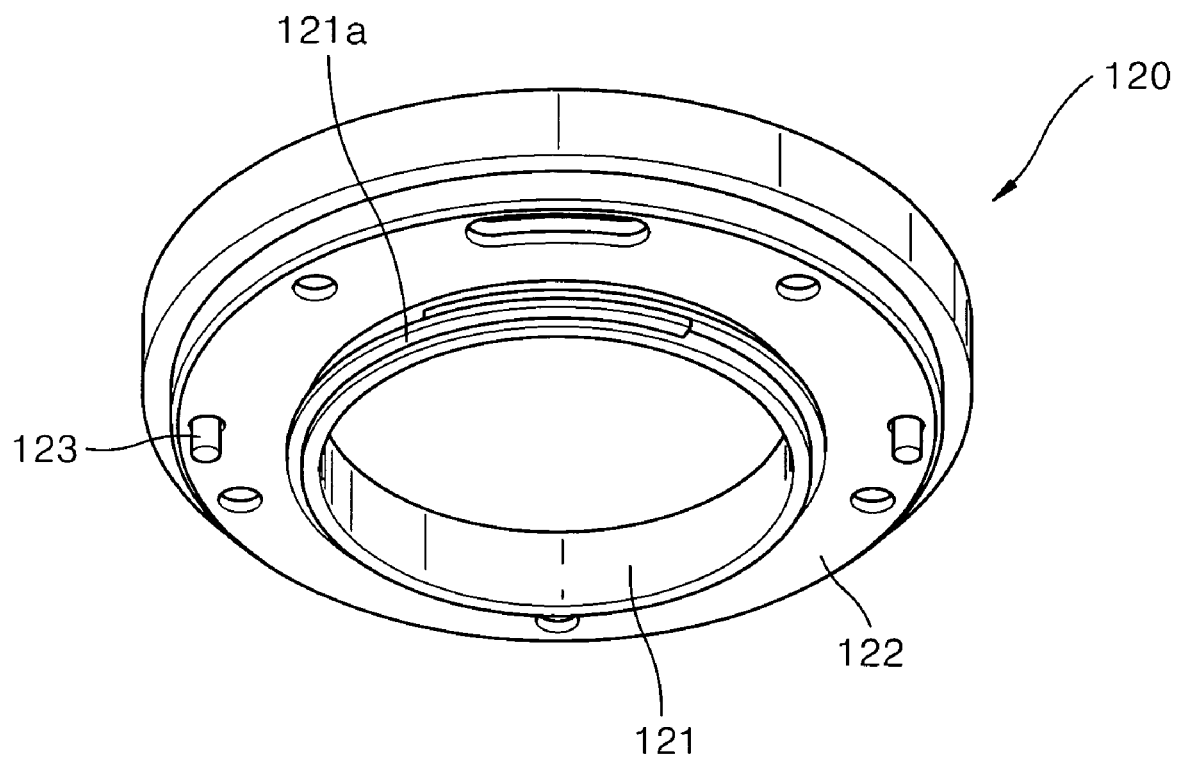
FIG. 3 illustrates an example of the lens module insertion part of the lens unit shown in FIG. 2.
Figure 4:
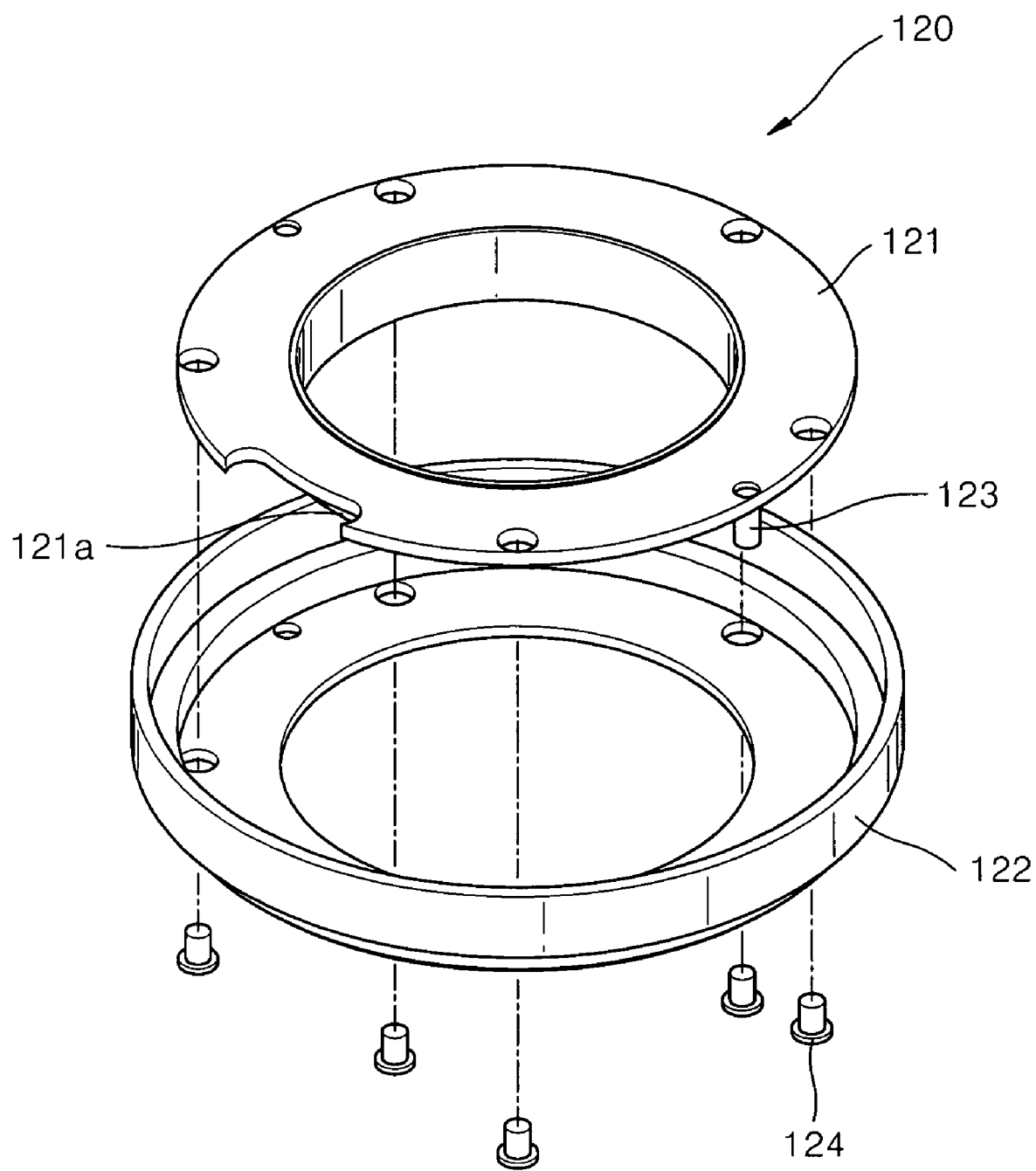
FIG. 4 illustrates an example of the lens module insertion part shown in FIG. 3, which includes a lens connector and a lens cover.

The lens module 110 may include at least one lens, and more specifically, a plurality of lenses. The lens 110 may be a zoom lens that may zoom in and out an input image. In this case, a zoom drive motor (not shown) may be mounted on the lens module 110 and/or the body 200. FIG. 3 illustrates an example of the lens module insertion part 120 of the lens unit 100 shown in FIG. 2, and FIG. 4 illustrates the lens module insertion part 120 shown in FIG. 3, which includes a lens connector 121 and a lens cover 122. Referring to FIGS. 3 and 4, the lens module insertion part 120 may include the lens connector 121 and the lens cover 122. The lens connector 121 is inserted into and connected to the mount part 300. The lens cover 122 fixes the lens connector 121 to the lens module 110.

Figure 6:
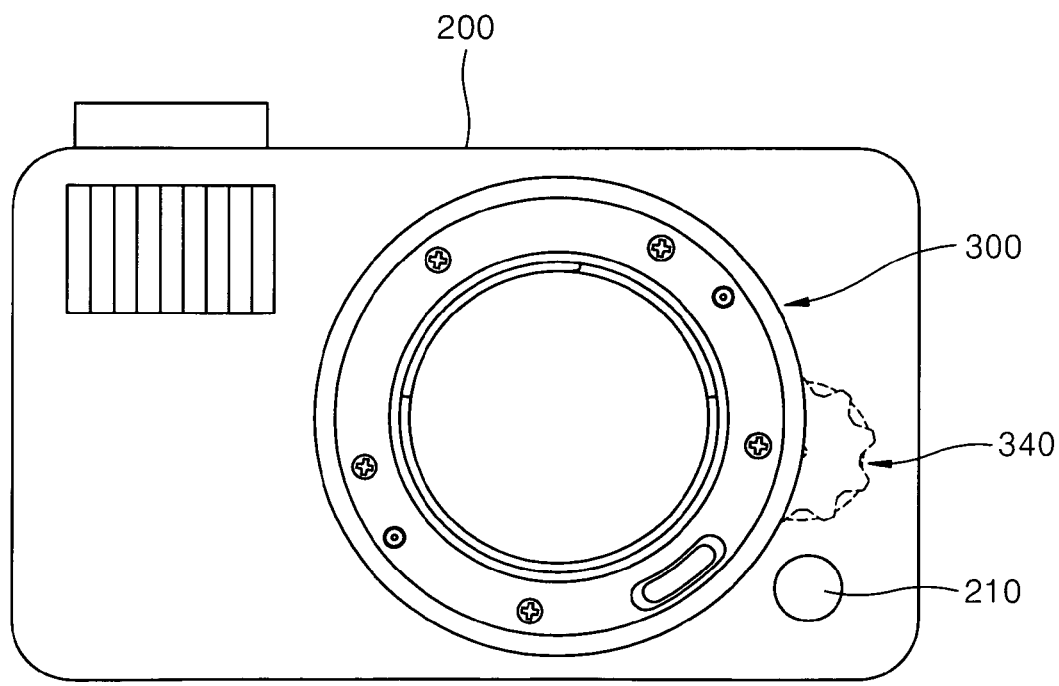
FIG. 6 illustrates an example of a body unit of the camera system shown in FIG. 1, in which a mount part is mounted on a body.
Figure 7:
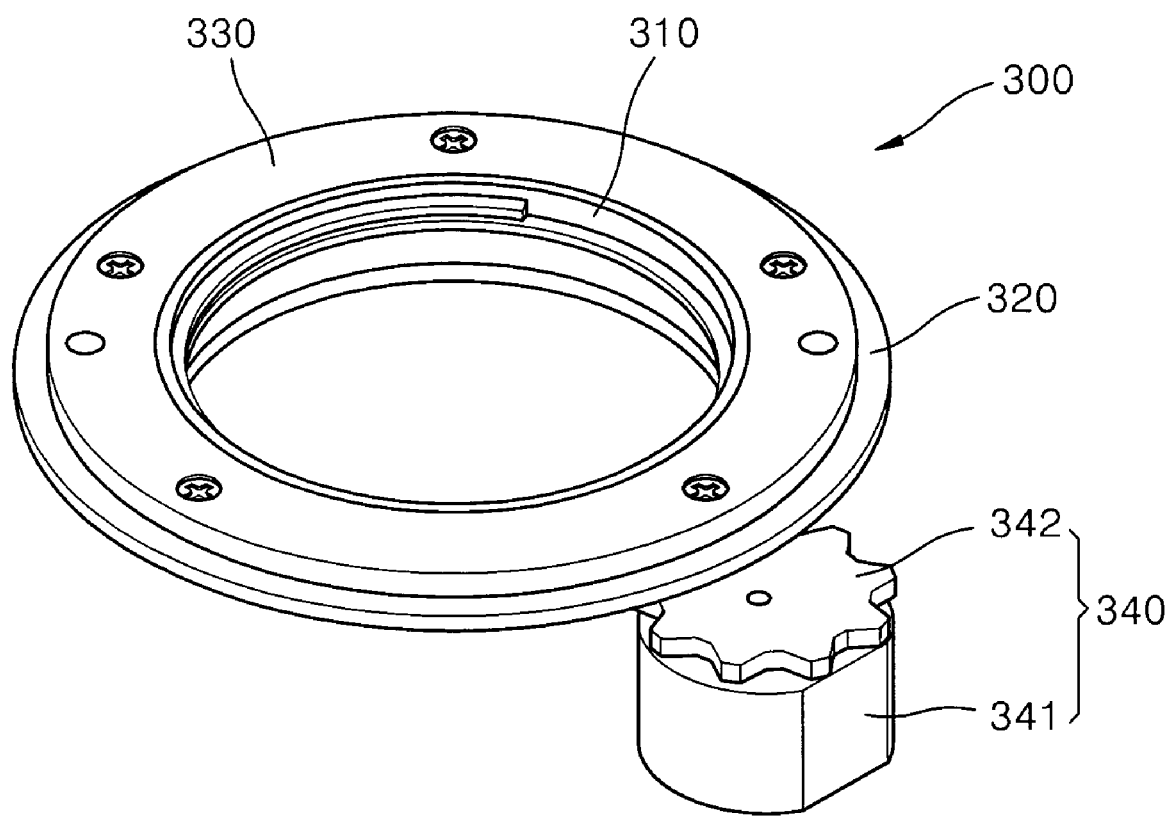
FIG. 7 is a perspective view of the mount part of the body unit shown in FIG. 6.
Figure 8:
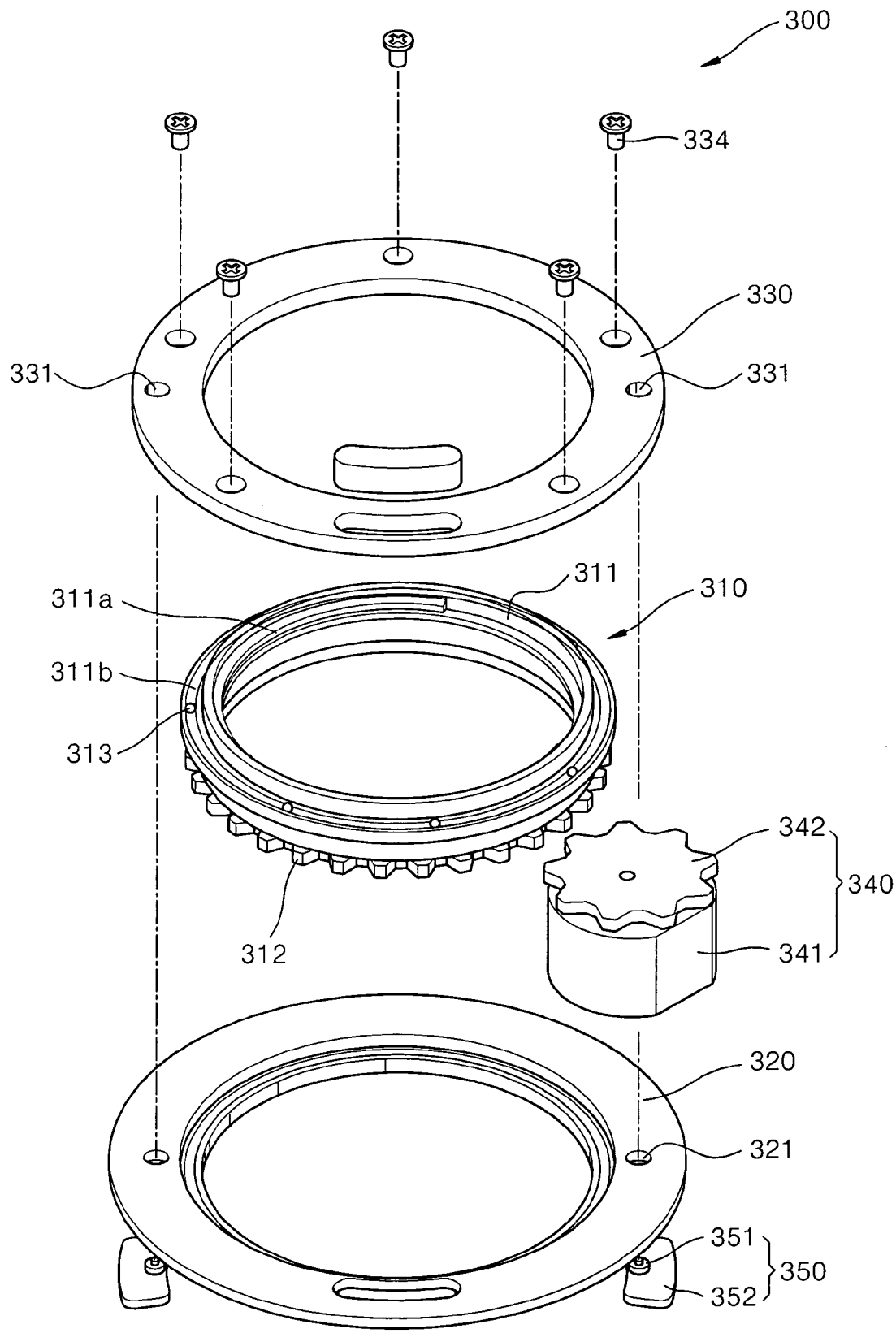
FIG. 8 is an exploded perspective view of the mount part shown in FIG. 7.

The lens connector 121 is inserted into the mount part 300 shown in FIGS. 6 through 8, and specifically, into a mount 330, and connected with a mount connector 310. The lens cover 122 fixes the lens connector 121 to the lens module 110 so that the lens module 110 can be fixed to the body 200 along with the lens module insertion part 120.

The lens module insertion part 120 may include lens unit protrusions 123 as detected elements so as to detect insertion of the lens unit 100 into the mount part 300. The lens unit protrusions 123 may be disposed on a surface of the lens connector 121 that faces the lens cover 122, specifically, a surface of the lens connector 121 that is combined with the lens cover 122.

Also, the lens unit protrusions 123 may protrude in a direction in which the lens module insertion part 120 is inserted. Thus, when the lens module insertion part 120 is inserted into the mount part 300, the lens unit protrusions 123 may be inserted into lens insertion detection holes 321 and 331 shown in FIG. 8, which are through holes made in the mount part 300. In this case, a lens detector 350, as shown in FIG. 8, for detecting the insertion of the lens unit protrusion 123 may be disposed on the reverse side of the lens insertion detection holes 321 and 331 into which the lens unit protrusions 123 are inserted.

That is, when the lens module insertion part 120 is inserted into the mount part 300, the lens unit protrusion 123 is brought into contact with a sensor of the lens detector 350 through the lens insertion detection holes 321 and 331 made in the mount part 300 so that the lens detector 350 can detect the insertion of the mount part 300. In this case, a plurality of lens unit protrusions 123 and a plurality of lens detectors may be provided. Also, the lens unit protrusions 123 may be spaced a predetermined distance apart from one another. Thus, the lens detectors 350 also may be spaced a predetermined distance apart from one another.

That is, when the lens unit protrusions 123, which are spaced the predetermined distance apart from one another, are detected by the corresponding lens detectors 350, respectively, the lens detectors 350 detect the insertion of the lens module insertion part 120 into the mount part 300. Thus, the mount part 300 can operate so that the lens module insertion part 120 can be fixedly combined with the mount part 300.

Accordingly, when the lens module insertion part 120 is inserted into the mount part 300 to a position at which the lens module insertion part 120 can be combined with the mount part 300 due to the operation of the mount part 300, the mount part 300 can operate to be combined with the lens module insertion part 120. Therefore, the lens module insertion part 120 can be fixedly combined with the mount part 300 tightly and safely.

Also, the lens connector 121 may include a screw element 121a. The screw element 121a of the lens connector 121 may include a screw thread, which is disposed on an outer circumferential surface of an end portion of the lens connector 121 that faces the mount part 300, and combined with a screw thread disposed on an inner surface of the mount part 300. In this case, the screw element 121a may form a helical or substantially helical gear. Even if the screw element 121a that forms the helical or substantially helical gear is screwed slightly, the lens connector 121 can be connected with the mount part 300 more tightly and softly.

Figure 5:
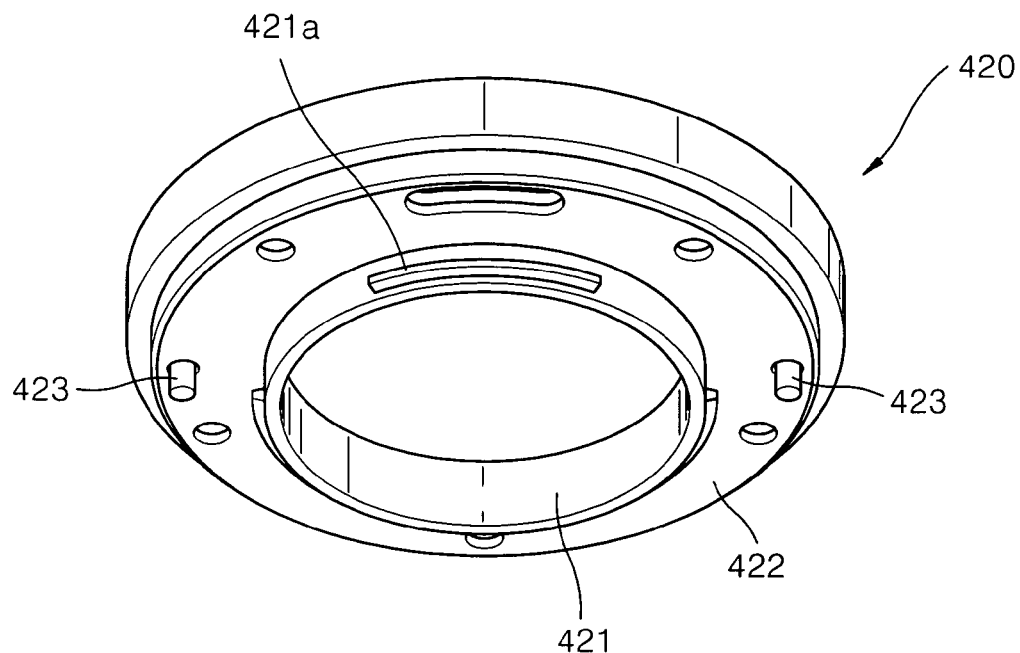
FIG. 5 illustrates an example of a lens module insertion part according to another embodiment of the present invention, in which a protrusion element is formed instead of a screw element of FIG. 3 on an outer circumferential surface of a lens connector.

FIG. 5 illustrates a lens module insertion part 420 according to another embodiment of the present invention, in which a protrusion element 421a is formed instead of the screw element 121a of FIG. 3 on an outer circumferential surface of a lens connector 421. That is, since the lens module insertion part 420 shown in FIG. 5 has substantially the same construction as the lens module insertion part 120 shown in FIG. 3 except for the protrusion element 421a, like reference numerals in FIGS. 3 and 5 denote like elements, thus their description will be omitted.

In this embodiment, the protrusion element 421a is formed on the lens connector 421 instead of the screw element 121a, so that the lens connector 421 to be combined with a mount connector 310 can be formed in a simpler manner. Furthermore, lens connectors 121 and 421 and lens covers 122 and 422 can be fixed to a lens module 110 by a plurality of screws 124 and 424.

FIG. 6 illustrates the body unit 200 and 300 of the camera system 10 shown in FIG. 1, in which the mount part 300 is mounted on the body 200, FIG. 7 is a perspective view of the mount part 300 of the body unit shown in FIG. 6, and FIG. 8 is an exploded perspective view of the mount part 300 shown in FIG. 7. Referring to FIGS. 6 through 8, the mount part 300 may include the mount connector 310, a mount support 320, the mount 330, a driver 340, and the lens detectors 350.

The lens module insertion part 120 is inserted into the mount 330. The lens detectors 350 detect the insertion of the lens module insertion part 120 into the mount 330. The mount connector 310 fixes the lens module insertion part 120. The driver 340 drives the mount connector 310 when the lens detectors 350 detect the insertion of the lens module insertion part 120.

The mount support 320 fixes the mount part 300 to the body 200 to interpose the mount connector 310 between the mount support 320 and the mount 330. In this case, the mount 330 may be disposed on a front surface of the body 200 into which the lens module insertion part 120 is inserted.

In order that the mount connector 310 may be rotatably installed between the mount 330 and the mount support 320, the mount connector 310 includes a connection gear 311, a rotation gear 312, a screw element 311a, and a plurality of bearings 313. In this example, the connection gear 311 has a cylindrical or substantially cylindrical shape. The rotation gear 312 is disposed on an outer circumferential surface of the connection gear 311 and receives rotary power from the driver 340. The rotation gear 312 may be a gear plate that rotates in gear with a driving gear 342 of the driver 340.

In this case, the rotation gear 312 and the driving gear 342 may be spur gears having different teeth numbers. The rotation gear 312, which is an idler gear, may have a diameter and teeth number greater than the diameter and teeth number of the driving gear 342 so that the rotation gear 312 receives more rotary power.

A screw thread of the screw element 311a may be disposed on an inner surface of the connection gear 311 so that the screw element 311a can be combined with the screw element 121a disposed on the outer circumferential surface of the lens module insertion part 120. The bearings 313 may be disposed on both surfaces of the mount connector 310 between one surface of the mount connector 310 and the mount 330 and between the other surface of the mount connector 310 and the mount support 340. Also, a guide groove 311b for guiding the bearings 313 may be formed along a circumferential surface of the connection gear 311. In this case, the bearings 313 may be a plurality of ball bearings.

While the mount connector 310 is rotating between the mount 330 and the mount support 340, the bearings 313 are guided by the guide groove 311b. Thus, the mount connector 310 can rotate smoothly between the mount 330 and the mount support 340.

As the mount connector 310 rotates, the lens module insertion part 120, which is inserted into the mount connector 310 through the mount 330, can rotate and be fixed to the mount part 300. During the rotation of the mount connector 310, the screw element 121a formed on the outer circumferential surface of the lens connector 121 comes into contact with the screw element 311a formed on the inner surface of the connection gear 311 of the mount connector 310 and rotates, and thus the lens connector 121 is fixedly combined with the mount connector 310. The mount connector 310 rotates to a predetermined limit, for example, in the range of at or about 360 degrees to at or about 480 degrees. For this, a sensor (not shown) may be installed at a rotation limit of the mount connector 310. The sensor, which senses the rotation limit of the mount connector 310, may be a limit switch. In another embodiment of the present invention, the driver 340 may calculate the amount of rotation of the mount connector 310 so that the mount connector 310 can rotate to a predetermined amount of rotation.

Figure 9:
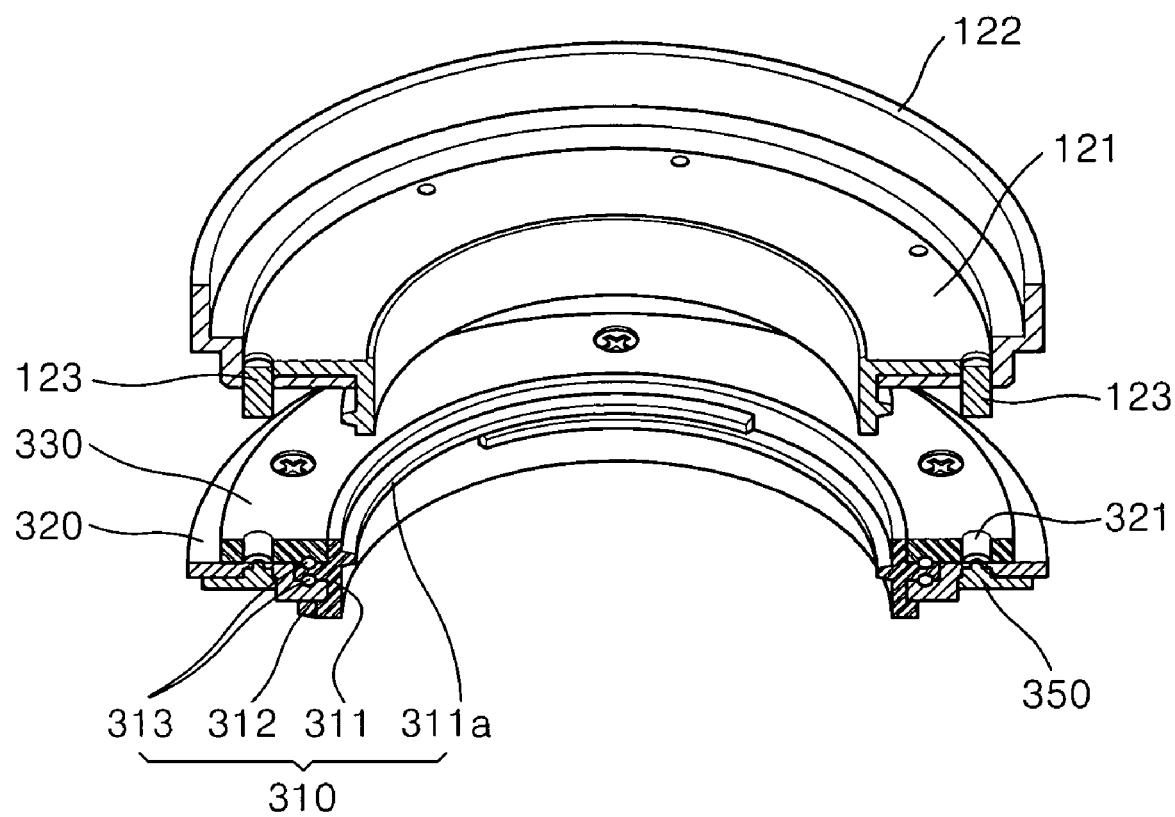
FIG. 9 illustrates an example of the combination of the lens module insertion part with the mount part in the camera system shown in FIG. 1.

FIG. 9 illustrates combination of the lens module insertion part 120 with the mount part 300 in the camera system 10 shown in FIG. 1. Referring to FIG. 9, as the mount connector 310 rotates, the lens module insertion part 120, which is inserted into the mount connector 310 through the mount 330, can rotate and be combined with the mount part 300.

In this case, the screw element 311a formed on the inner surface of the connection gear 311 of the mount connector 310 is brought into contact with the screw element 121a formed on the outer circumferential surface of the lens connector 121 so that the lens module insertion part 120 can be combined with the mount part 300. Also, when the lens module insertion part 120 is inserted to a predetermined position in the mount part 300, the lens unit protrusion 123 is brought into contact with a sensor 352 of the lens detector 350 through the lens insertion detection holes 321 and 331 that are formed through the mount 300 and the mount support 320, respectively, so that the sensor 352 can detect the insertion of the lens module insertion part 120 into the mount part 300.

The lens detector 350 may include a sensor support 351 and the sensor 352. The sensor support 351 may be mounted at the mount support 320. The sensor 352 is mounted on the sensor support 351 and can sense the insertion of the lens module insertion part 120.

A plurality of lens detectors 350 may be prepared. In this case, when all the lens detectors 350 detect the insertion of the lens module insertion part 120, the driver 340 may start operating.

The sensor 352 may be disposed on a reverse side of a surface of the mount support 320 that faces the mount 330. The lens insertion detection holes 321 and 331 may be formed through the mount 330 and the mount support 320, respectively. Also, the lens insertion detection holes 321 and 331 may be disposed through the mount 330 and the mount support 320 in positions corresponding to the sensor 352.

The sensor 352 may be a contact sensor that detects a state of contact due to short-circuiting between two points of contact. However, the sensor 352 according to the embodiments of the present invention described herein is not restricted to the above description, and sensors of various kinds may be located in various positions. That is, the sensor 352 may be disposed in a different position of the camera system 10 and replaced by other various sensors including a noncontact sensor.

The driver 340 may include a driving motor 341 and the driving gear 342. The driving motor 341 is installed on the body 200 and provides driving power. The driving gear 342 is mounted on the driving motor 341 to be capable of rotating on a rotation axis of the driving motor 341. The driving motor 341 may be a stepping motor that can be easily controlled.

The mount 330 is combined with the mount support 320 by a screw 334, and the mount connector 310 can be rotatably combined between the mount 330 and the mount support 320. The camera system 10 may include a lens attachable/detachable button 210, which is installed on the body 200. The lens attachable/detachable button 210 may be attached to the front surface of the body 200 to or from which the lens unit 100 is attached or detached, to facilitate attachment and detachment of the lens unit 100.

When the lens attachable/detachable button 210 is pushed, the driver 340 of the mount part 300 is driven so that the lens unit 100 can be separated from the body 200. In this case, when the lens attachable/detachable button 210 is pushed, the driving motor 341 of the driver 340 may rotate in an opposite direction to a direction in which it rotates when the lens unit 100 is mounted.

That is, when the lens attachable/detachable button 210 is pushed, the driving motor 341 rotates in a reverse direction so that the lens unit 100 can be separated from the body 200. Also, in the camera system 10 according to an embodiment of the present invention, a user may combine the lens module insertion part 120 with the mount part 300 or separate the lens module insertion part 120 from the mount part 300 by hand. Hence, even if power is not supplied to the mount part 300, it is possible to combine the lens module insertion part 120 with the mount part 300 or separate the lens module insertion part 120 from the mount part 300.

Figure 10:
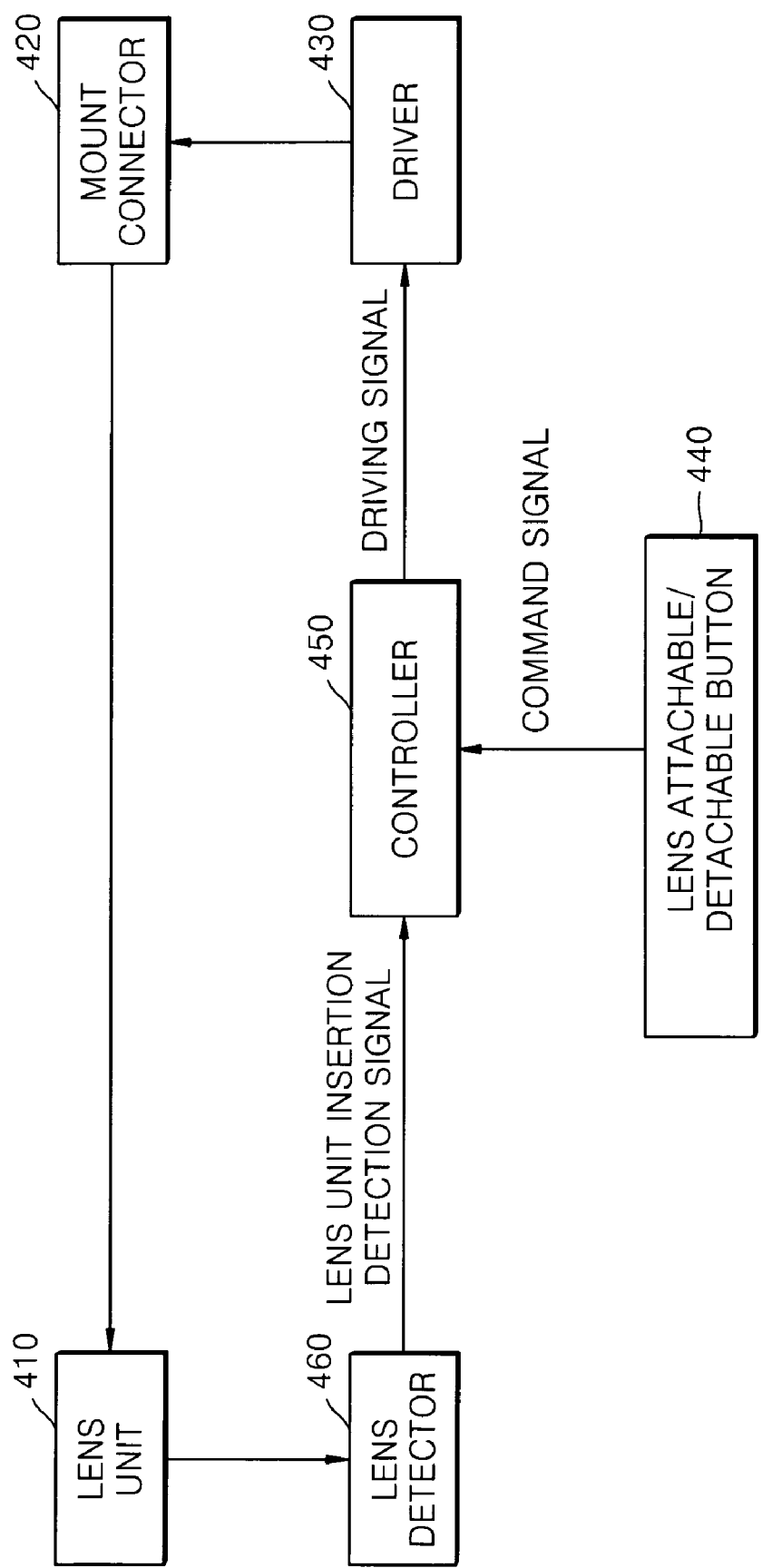
FIG. 10 is a block diagram of an example of a camera system according to another embodiment of the present invention.

The camera system 10 shown in FIGS. 1 through 9 may be controlled using a system shown in FIG. 10. Also, the camera system 10 shown in FIGS. 1 through 9 may be controlled according to a method for controlling a camera system, which will be described with reference to the flowcharts S100 and S200 exemplified in FIG. 11 and/or FIG. 12.

FIG. 10 is a block diagram of a camera system 500 according to another embodiment of the present invention. Referring to FIG. 10, the camera system 500 includes a body (e.g., body 200 shown in FIG. 1), a lens unit 510, a mount connector 520, a driver 530, a lens attachable/detachable button 540, a controller 550, and a lens detector 560.

The body 200 shown in FIG. 1) may include various internal components in order to realize functions of the camera system 500. In the current embodiment, the mount connector 520, the driver 530, the lens attachable/detachable button 540, the controller 550, and the lens detector 560 may be mounted inside and/or outside the body 200 shown in FIG. 1.

The lens unit 510 may be mounted to be attachable to and detachable from the body 200 shown in FIG. 1. The lens unit 510 may include a lens module (refer to 110 in FIG. 2), which includes at least one lens, specifically, a plurality of lenses.

A lens module insertion part 120 as shown in FIG. 2 may be attached to the lens module 110 so that the lens unit 510 can be fixedly inserted into and combined with the body 200. In other words, the lens unit 510 may be mounted on the body 200 through the mount connector 520 by use of the lens module insertion part 120.

The mount connector 520 is mounted on the body 200 and fixes the lens unit 510 so that the lens unit 510 is attachable to and detachable from the body 200. The mount connector 520 may correspond to the mount connector 310 shown in FIGS. 7 through 9.

The driver 530 drives the mount connector 520 in response to a driving signal output from the controller 550. The driver 530 may be the driver 340 shown in FIGS. 7 through 9.

The lens attachable/detachable button 540 externally receives a command to connect the lens unit 510 with the mount connector 520 or a command to separate the lens unit 510 from the mount connector 520 and outputs a command signal. The controller 550 receives the command signal from the lens attachable/detachable button 540 and produces the driving signal to a driving motor.

In this case, a user may select the lens attachable/detachable button 540. Thus, when the user selects the lens attachable/detachable button 540, a command signal may be output. The lens attachable/detachable button 540 may be the lens attachable/detachable button 210 shown in FIG. 6.

In a state where lens unit 510 is combined with the mount connector 520, when the lens attachable/detachable button 540 is pushed, the driving motor of the driver 530, which corresponds to the driving motor 341 shown in FIGS. 7 and 8, rotates in a reverse direction so that the lens unit 510 can be separated from the lens connector 520. In this case, when the lens attachable/detachable button 540 is pushed, a command signal for separating the lens unit 510 may be output. In response to the command signal, the controller 550 outputs a reverse rotation driving signal to the driver 530. Thus, the driving motor 341 rotates in a reverse direction so that the lens unit 510 can be separated from the lens connector 520. In a state where the lens unit 510 is separated from the mount connector 520 and located in a position where it can be connected to the mount connector 520, when the lens attachable/detachable button 540 is pushed, the driving motor 341 of the driver 530 rotates in a positive direction, so that the lens unit 510 can be fixedly combined with the lens connector 520. When the lens attachable/detachable button 540 is pushed, a command signal for mounting the lens unit 510 may be output. In response to the command signal, the controller 550 outputs a positive rotation driving signal to the driver 530. Thus, the driving motor 341 rotates in a positive direction so that the lens unit 510 can be combined with the lens connector 520.

In another case, the lens attachable/detachable button 540 may be used only to separate the lens unit 510 from the mount connector 520. Thus, in order to connect the lens unit 510 with the mount connector 520, the lens detector 560 may detect insertion of the lens unit 510 into the mount connector 520 and operate the driver 530.

The lens detector 560 detects the insertion of the lens unit 510 into the body 200 and outputs a lens unit insertion detection signal. The lens detector 560 may be the lens detector 350 shown in FIGS. 7 through 9. In this case, the controller 550 may output a driving signal in response to the lens unit insertion detection signal output from the lens detection unit 560.

In the camera system 500 according to the present embodiment, when the lens unit 510 is inserted into the mount connector 520 mounted on the body 200, the mount connector 520 detects the insertion and automatically operates to fix the lens unit 510 to the body 200. In other words, the camera system 500 may be embodied as an automatic lens connection type so that the mount connector 520 can detect the lens unit 510 and automatically combines the lens unit 510 with the body 200.

Also, in the camera system 500, the lens unit 510 may be automatically separated from the body 200 by selection of the lens attachable/detachable button 540 by electromotion. In other words, the camera system 500 may be embodied as an automatic lens separation type so that the lens unit 510 can be automatically separated from the body 200 by selection of the lens attachable/detachable button 540.

Accordingly, the lens unit 510 can be promptly combined with and/or separated from the body 200. Also, a user can promptly change desired lens modules according to the user's intention in an easier way.

Figure 11:
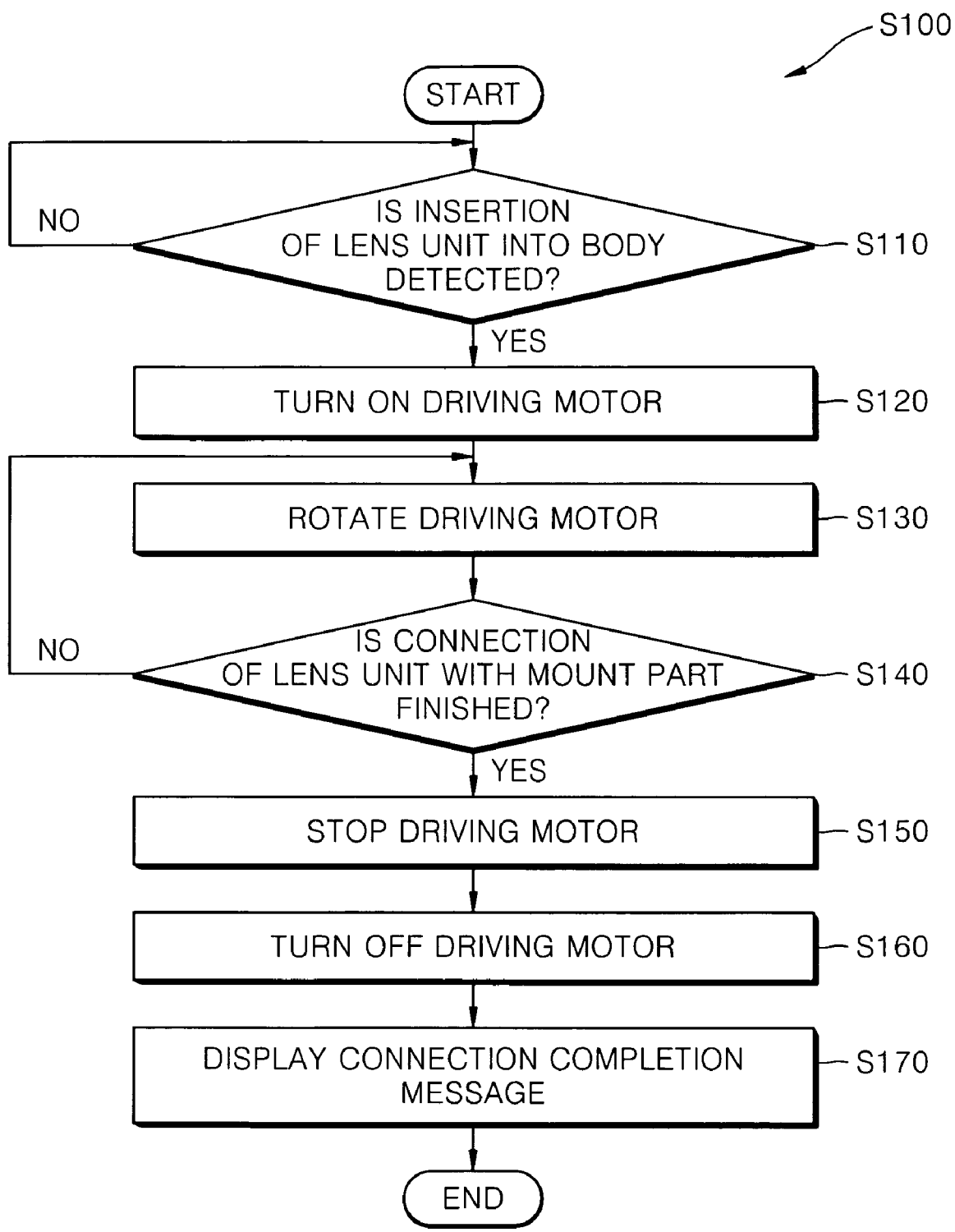
FIG. 11 is a flowchart illustrating an example of a process of inserting a lens unit according to a method for controlling a camera system according to an embodiment of the present invention.
Figure 12:
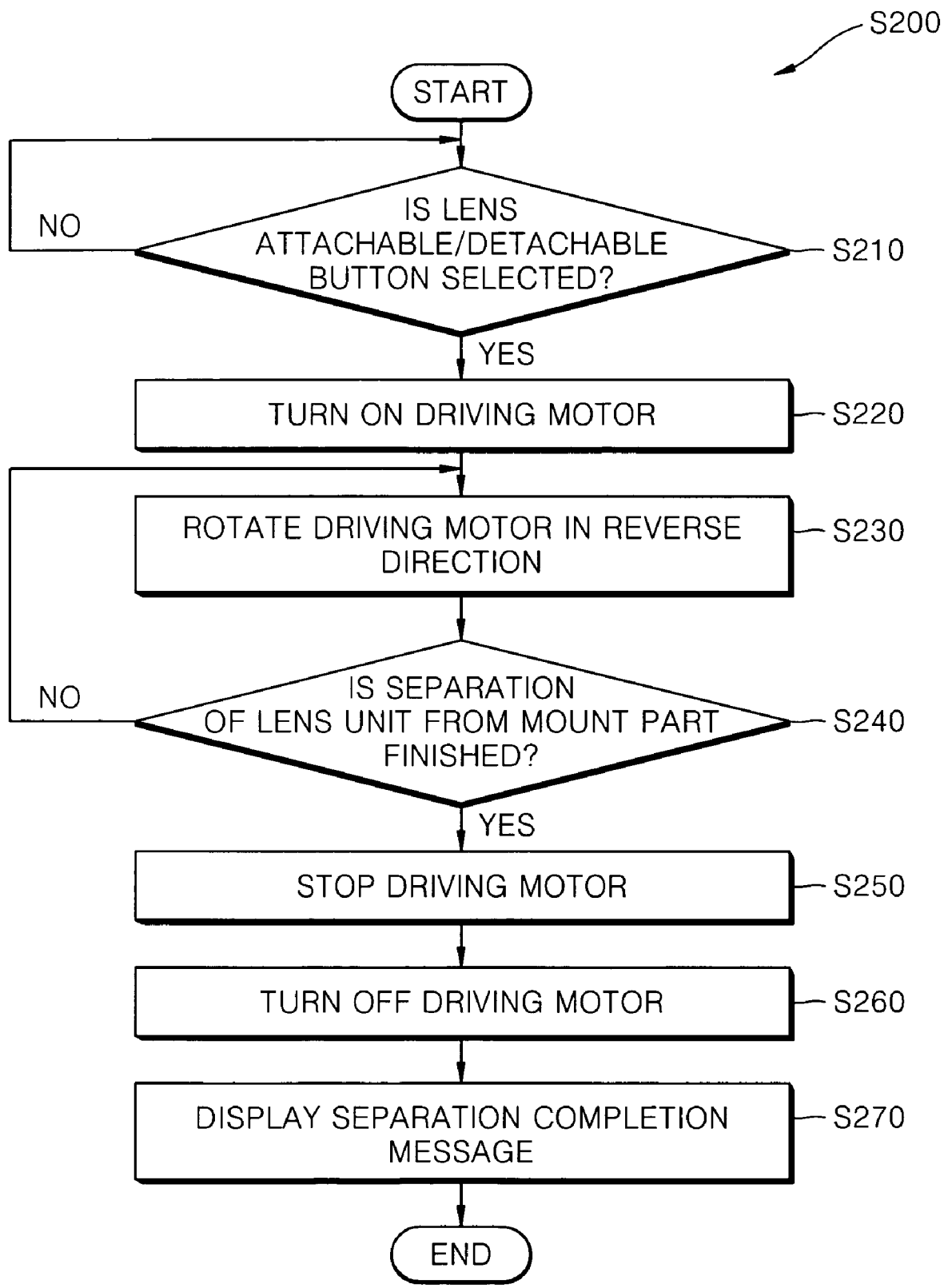
FIG. 12 is a flowchart illustrating an example of a process of separating a lens unit according to a method for controlling a camera system according to another embodiment of the present invention.

As mentioned above, the camera system 500 shown in FIG. 10 may be controlled according to the methods for controlling a camera system, which will be described with reference to FIG. 11 and/or FIG. 12. FIG. 11 is an example of a flowchart illustrating a process S100 of inserting a lens unit according to a method for controlling a camera system according to an embodiment of the present invention, and FIG. 12 is an example of a flowchart illustrating a process of separating S200 a lens unit according to a method for controlling a camera system according to another embodiment of the present invention. The camera systems 10 and 500 described with reference to FIGS. 1 through 10 may be controlled in accordance with these methods.

In the lens unit mounting process S100, insertion of a lens unit is detected and the lens unit is fixed to a body. The lens unit mounting process S100 may include an operation S110 of detecting the insertion of the lens unit, operations S120 and S130 for driving a driving motor to connect the lens unit with a mount part, an operation S140 of determining if connection of the lens unit with the mount part is finished, and operations S150, S160, and S170 of finishing the mounting of the lens unit.

Specifically, in operation S110, the insertion of the lens unit into the body is detected. In this case, when insertion of the lens unit into the mount part is detected, a lens unit insertion detection signal may be produced.

Thereafter, the lens unit is connected to the mount part. The driving motor is turned on in operation S120, and rotated in operation S130.

In operation S140, it is determined if the connection of the lens unit with the mount part is finished. The lens unit is connected with the mount part by rotating a mount connector of the mount part, which is connected with the lens unit, due to driving power provided by the driving motor. In this case, a rotation limit of the mount connector of the mount part rotates is previously set, so that completion of the connection of the lens unit with the mount part can be determined by sensing the rotation limit of the mount connector.

The mounting of the lens unit is then finished. Specifically, the driving motor is stopped in operation S150, and turned off in operation S160, and a connection completion message is displayed in a display device in operation S170.

In the lens unit separation process S200 shown in FIG. 12, when a lens attachable/detachable button is selected, the lens unit is separated from the body. The lens unit separation process S200 may include an operation S210 of detecting the lens attachable/detachable button, operations S220 and S230 of separating the lens unit from the mount part, an operation S240 of determining if separation of the lens unit from the mount part is finished, and operations S250, S260, and S270 of finishing the separation of the lens unit.

Specifically, in operation S210, selection of the lens attachable/detachable button is detected. In this case, when the selection of the lens attachable/detachable button is detected, a lens unit separation command signal may be produced.

Thereafter, the lens unit is separated from the mount part. The driving motor is turned on in operation S220, and rotated in a reverse direction in operation S230.

In operation S240, it is determined if the separation of the lens unit from the mount part is finished. The lens unit is separated from the mount part by rotating the mount connector of the mount part, which is connected with the lens unit, in a reverse direction due to driving power provided by the driving motor. In this case, the rotation limit of the mount connector of the mount part rotates is previously set, so that completion of the separation of the lens unit from the mount part can be determined by sensing the rotation limit of the mount connector.

The separation of the lens unit is then finished. Specifically, the driving motor is stopped in operation S250, turned off in operation S260, and a separation completion message is displayed on the display device in step S270.

In the method S100 and S200 for controlling the camera system according to this embodiment of the present invention, when the lens unit is inserted into the mount connector mounted on the body, the mount connector detects the insertion of the lens unit and automatically operates to fix the lens unit to the body. That is, according to the methods exemplified by flowcharts S100 and S200, the camera system can be embodied as an automatic lens connection type, so that when the insertion of the lens unit is detected, the lens unit can be automatically combined with the body.

Also, in the methods exemplified by flowcharts S100 and S200, the lens unit can be automatically separated from the body by electromotion by selection of the lens attachable/detachable button. That is, according to the methods shown in the flowcharts S100 and S200, the camera system can be embodied as an automatic lens separation type, so that the lens unit can be automatically separated from the body by selection of the lens attachable/detachable button. As a consequence, the lens unit can be promptly combined with and separated from the body. Also, a user can promptly change desired lens modules according to the user's intention in an easier way.

While the present invention has been particularly shown and described with reference to exemplary embodiments thereof, it will be understood by one of ordinary skill in the art that various changes in form and details may be made therein without departing from the spirit and scope of the present invention as defined by the following claims.

What is claimed is:

1. A camera system comprising:
    a body;
    a lens module configured for attachment to and detachment from the body;
    a lens module insertion part mounted on a surface of the lens module that faces the body;
    a mount part for detecting insertion of the lens module insertion part into the body to mount the lens module on the body, the mount part comprising:
        a mount into which the lens module insertion part is inserted;
        a lens detector for detecting insertion of the lens module insertion part into the mount;
        a mount connector for fixing the lens module insertion part; and
        a driver for driving the mount connector when the lens detector detects the insertion of the lens module insertion part
    wherein the mount connector comprises:
        a connection gear having a substantially cylindrical shape;
        a screw element having a screw thread that is disposed on an inner surface of the connection gear and combined with the lens module insertion part; and
        a rotation contacting element disposed on an outer circumferential surface of the connection gear and receiving driving power from the driver via contact.

2. The system of claim 1, wherein the mount is disposed on a front surface of the body into which the lens module is inserted,
    and the mount part further includes a mount support for fixing the mount part to the body to interpose the mount connector between the mount and the mount support.

3. The system of claim 2, wherein the mount connector is rotatably installed between the mount and the mount support.

4. The system of claim 1, wherein the driver comprises:
    a driving motor installed on the body; and
    a driving gear mounted on the driving motor for rotating on a rotation axis of the driving motor.

5. The system of claim 1, wherein the mount connector further comprises a plurality of bearings, which are interposed between the mount connector and the mount and between the mount connector and a mount support.

6. The system of claim 5, wherein the bearings are a plurality of ball bearings, and a guide groove for guiding the ball bearings is formed along a circumferential surface of the connection gear.

7. The system of claim 1, wherein the mount part includes a plurality of lens detectors, which are disposed apart from one another,
    and the driver starts operating when all the lens detectors detect the insertion of the lens module insertion part.

8. The system of claim 1, wherein the lens module insertion part comprises:
    a lens connector inserted into and connected to the mount part; and
    a lens cover for fixing the lens connector to the lens module.

9. The system of claim 8, wherein the lens connector includes a screw element having a screw thread, which is disposed on an outer circumferential surface of an end portion of the lens connector, which faces the mount part, and combined with a screw thread disposed on an inner surface of the mount part.

10. The system of claim 8, wherein the lens connector includes a protrusion element having a plurality of protrusions, which is disposed along an outer circumferential surface of an end portion of the lens connector, which faces the mount part, and combined with a screw thread disposed on an inner surface of the mount part.

11. The system of claim 8, wherein the lens module insertion part further comprises a lens unit protrusion disposed on a surface of the lens connector that faces the lens cover, the lens unit protrusion protruding in a direction in which the lens module insertion part is inserted, the lens unit protrusion inserted into a through hole formed in the mount part.

12. The camera system according to claim 1, wherein the rotation contacting element is a gear.

13. A camera system comprising:
    a body;
    a lens module configured for attachment to and detachment from the body;
    a lens module insertion part mounted on a surface of the lens module that faces the body;
    a mount part for detecting insertion of the lens module insertion part into the body to mount the lens module on the body;
    wherein the mount part comprises:
        a mount into which the lens module insertion part is inserted;
        a lens detector for detecting insertion of the lens module insertion part into the mount;
        a mount connector for fixing the lens module insertion part; and
        a driver for driving the mount connector when the lens detector detects the insertion of the lens module insertion part;
    wherein the mount is disposed on a front surface of the body into which the lens module is inserted, and the mount part further includes a mount support for fixing the mount part to the body to interpose the mount connector between the mount and the mount support; and
    wherein the lens detector comprises:
        a sensor support mounted on the mount support; and
        a sensor mounted on the sensor support and for sensing the insertion of the lens module insertion part.

14. The system of claim 13, wherein the sensor is disposed on a reverse side of a surface of the mount support that faces the mount, and through holes are formed through the mount and the mount support, respectively, in positions corresponding to the sensor.

15. A camera system comprising:
a body;
a lens module configured for attachment to and detachment from the body;
a lens module insertion part mounted on a surface of the lens module that faces the body;
a mount part for detecting insertion of the lens module insertion part into the body to mount the lens module on the body;
wherein the mount part comprises:
  a mount into which the lens module insertion part is inserted;
  a lens detector for detecting insertion of the lens module insertion part into the mount;
  a mount connector for fixing the lens module insertion part; and
  a driver for driving the mount connector when the lens detector detects the insertion of the lens module insertion part;
wherein:
the mount connector includes a screw element, which is disposed on an inner circumferential surface of the mount connector and combined with the lens module insertion part, and
the lens connector includes a screw element, which is disposed on an outer circumferential surface of the lens connector and screw-connected with the screw element of the mount connector, and
at least one of the screw elements of the mount connector and the lens connector includes a substantially helical gear.

16. A camera system comprising:
a body;
a lens unit configured for attachment to and detachment from the body;
a mount connector mounted on the body and for fixing the lens unit;
a driver for driving the mount connector in response to an externally input driving signal;
a lens button for externally receiving a command to at least one of connect the lens unit with the mount connector and separate the lens unit from the mount connector to produce a command signal; and
a controller for producing the driving signal in response to the command signal;
wherein the mount connector comprises:
  a connection gear having a substantially cylindrical shape;
    a screw element having a screw thread that is disposed on an inner surface of the connection gear and combined with a lens module insertion part; and
    a rotation contacting element disposed on an outer circumferential surface of the connection gear and receiving driving power from the driver via contact.

17. The system of claim 16, further comprising a lens detector for detecting insertion of the lens unit into the body to produce a lens unit insertion detection signal, wherein the controller produces the driving signal in response to the lens unit insertion detection signal.

18. A method for controlling a camera system to fix an attachable lens unit to a mount part of a body, the method comprising:
detecting insertion of the lens unit into the body;
driving a driving motor to connect the lens unit with the mount part using a connection gear associated with the driving motor, the connection gear having a substantially cylindrical shape and using a screw element having a screw thread that is disposed on an inner surface of the connection gear and combined with a lens module insertion part, the connection gear comprising a rotation contacting element disposed on its outer circumferential surface and receiving driving power from the driving motor via contact;
determining if the connection of the lens unit with the mount part is finished; and
finishing the driving of the driving motor.

19. A method as claimed in claim 18, further comprising:
displaying a connection completion indicator after the finishing step.

* * * * *